(No Model.)

L. CHEVALIER & L. GRAILLOT.
HOLDER FOR USE IN CARVING MEAT.

No. 298,174. Patented May 6, 1884.

Witnesses:
C. Sedgwick
A. H. Davis

Inventors:
L. Chevalier
L. Graillot
By Munn & Co
Attorneys.

United States Patent Office.

LOUIS CHEVALIER AND LEON GRAILLOT, OF PARIS, FRANCE.

HOLDER FOR USE IN CARVING MEAT.

SPECIFICATION forming part of Letters Patent No. 298,174, dated May 6, 1884.

Application filed March 14, 1884. (No model.)

*To all whom it may concern:*

Be it known that we, LOUIS CHEVALIER and LEON GRAILLOT, of the city of Paris, France, have invented new and useful Improvements in Holders for Use in Carving Meat, and for similar Purposes, of which the following is a full, clear, and exact description.

This invention relates to a device designed to grasp the bone of a cutlet, to avoid holding the same in the hand when removing the meat therefrom. The said device also serves as a holder for a leg of mutton, the leg of a chicken, or the like.

We shall now proceed to describe the invention, having reference to the accompanying drawings, in which—

Figure 5:
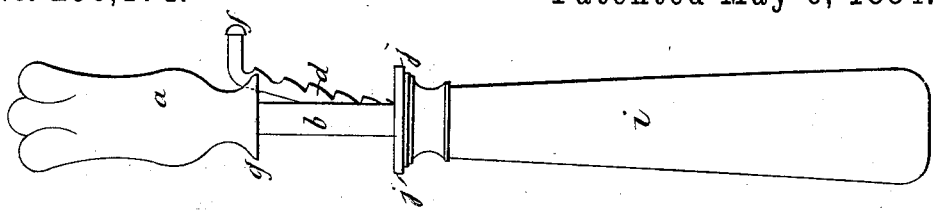
Figure 4:
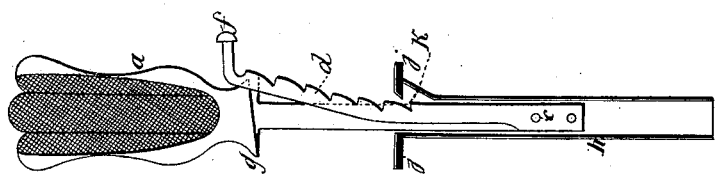
Figure 3:
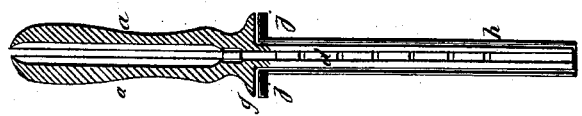
Figure 2:
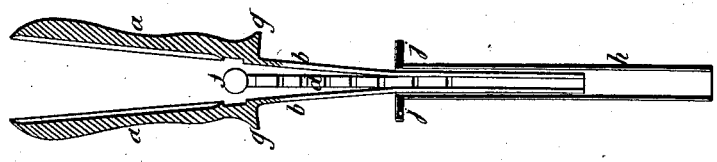
Figure 1:
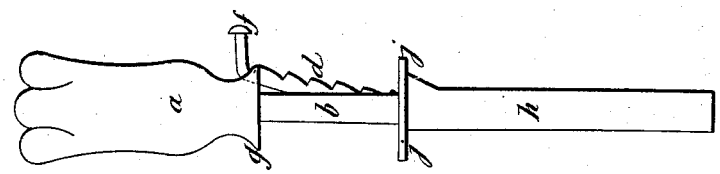

Figure 1 is a front elevation of the said cutlet-holder. Fig. 2 is a longitudinal section of the same perpendicular to the jaws of the holder. Fig. 3 is a similar view, showing the holder closed. Fig. 4 is a longitudinal section between the jaws of the holder, the latter being open. Fig. 5 is a front elevation of the holder open, the same being mounted in a handle.

Similar letters of reference indicate corresponding parts throughout the figures.

The holder is composed of two jaws, *a*, terminated by two blades, *b*, riveted at their extremities *c*, and acting as springs to keep the jaws *a* apart. Between these two blades *b* is riveted a rack, *d*, the latter having a tendency to spring laterally from the direction of the said blades *b*. This rack, which is preferably punched out of a steel blade, is bent at its upper part, and terminates in a knob, *f*. The above-mentioned pieces can be introduced as far as projections *g*, formed at the bottoms of the jaws *a*, into a sheath, *h*, fixed in a handle, *i*, which may be of any suitable shape. This sheath *h* is provided with a pawl, *j*, the edge of which forms an internal projection or tooth, *k*, which engages with the rack *d*.

When the said holder is used after the cutlet-bone or the like has been placed between the two jaws *a*, (which are grooved on their inner faces, in order to enable them to firmly grasp the said bone and prevent it from slipping,) the blades are pushed into the said sheath, thereby pressing the jaws upon the bone until the latter is firmly grasped, the said rack, which engages with the tooth *k*, holding the jaws in the desired position. In order to open the jaws, it is sufficient to press the knob *f*, which releases the rack from the tooth *k*, thereby enabling the blades to be readily withdrawn.

We claim—

A cutlet-holder composed of the sheath *h*, fixed into any suitable handle, the jaws *a*, grooved on their inner faces, and the blades *b*, acting as springs, in combination with the rack *d*, or its equivalent, engaging into the inner projection, *k*, on the pawl *j* of the sheath *h*, the whole constructed and operating as hereinbefore specified, and for the purposes set forth.

The foregoing specification of our improvements in holders for use in carving meat, and for similar purposes, signed by us.

LOUIS CHEVALIER.
LEON GRAILLOT.

Witnesses:
ROBT. M. HOOPER,
GEORGE BRAUN.